US008243422B2

(12) United States Patent
Leeman et al.

(10) Patent No.: US 8,243,422 B2
(45) Date of Patent: Aug. 14, 2012

(54) MOTOR CONTROL CENTER AND SUBUNIT THEREFOR

(75) Inventors: Daniel Jason Leeman, Fuquay-Varina, NC (US); Edgar Yee, Chapel Hill, NC (US); Robert Allan Morris, Fayetteville, NC (US); Marsha Jean Harris, Fayetteville, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/039,392

(22) Filed: Mar. 3, 2011

(65) Prior Publication Data

US 2011/0149479 A1 Jun. 23, 2011

Related U.S. Application Data

(62) Division of application No. 12/535,763, filed on Aug. 5, 2009, now Pat. No. 7,965,493.

(51) Int. Cl.
*H02B 11/00* (2006.01)
*H01H 9/20* (2006.01)

(52) U.S. Cl. ........ 361/621; 361/608; 361/614; 361/615; 361/622; 361/628; 200/50.17; 200/50.21; 200/50.26

(58) Field of Classification Search .......... 361/605–628, 361/631–636, 640, 673; 50/50.01–50.26, 50/50.32–50.43, 43.01, 400, 401, 331, 293, 50/500, 501, 318–327, 43.16, 43.19, 308; 312/223.2, 223.3, 199, 236, 296
See application file for complete search history.

(56) References Cited

U.S. PATENT DOCUMENTS

| 2,883,483 | A | * | 4/1959 | Horn ......................... 200/50.21 |
| 3,142,003 | A | * | 7/1964 | Olashaw ....................... 361/608 |
| 3,626,253 | A | * | 12/1971 | Sturdivan ..................... 361/608 |
| 3,628,098 | A | * | 12/1971 | Sturdivan ..................... 361/611 |
| 4,024,441 | A | * | 5/1977 | Coyle et al. ................... 361/624 |
| 4,180,845 | A | * | 12/1979 | Shariff et al. ................. 361/624 |
| 4,305,114 | A | * | 12/1981 | Takagi et al. ................. 361/614 |
| 4,621,303 | A | * | 11/1986 | Rowe ............................ 361/608 |
| 4,768,967 | A | * | 9/1988 | Fritsch ......................... 439/152 |
| 4,926,286 | A | * | 5/1990 | Maki et al. .................... 361/617 |
| 5,424,910 | A | * | 6/1995 | Lees ............................. 361/615 |
| 5,642,256 | A | * | 6/1997 | Pugh et al. .................... 361/615 |
| 5,654,871 | A | * | 8/1997 | Wentler et al. ................ 361/622 |
| 5,927,766 | A | * | 7/1999 | Rosen .......................... 292/101 |
| 6,031,192 | A | * | 2/2000 | Liebetruth ................. 200/50.21 |
| 6,252,186 | B1 | * | 6/2001 | Liebetruth et al. ......... 200/43.01 |
| 6,284,989 | B1 | * | 9/2001 | Bernier et al. ............. 200/50.12 |
| 6,438,800 | B1 | * | 8/2002 | Narang et al. .................. 16/389 |
| 6,476,335 | B2 | * | 11/2002 | Letient ....................... 200/50.26 |

(Continued)

*Primary Examiner* — Michail V Datskovskiy
(74) *Attorney, Agent, or Firm* — Dawn C. Wolff; Martin J. Moran

(57) ABSTRACT

A subunit is provided for a motor control center including an enclosure, a number of compartments, a plurality of power lines, and a number of covers for covering the compartments. The subunit includes a housing removably disposed within a corresponding one of the compartments, a plurality of electrical contacts movably coupled to the housing, and an actuating assembly for moving the electrical contacts into and out of electrical contact with the power lines. The subunit further includes at least one of a locking assembly, a panel assembly, and a secondary disconnect assembly. The locking assembly locks the position of the electrical contacts and restricts access to the actuating assembly. The panel assembly is pivotable and translatable with respect to the subunit housing. The secondary disconnect assembly is independent from the actuating assembly in order that movement of the electrical contacts does not move the secondary disconnect assembly.

5 Claims, 9 Drawing Sheets

U.S. PATENT DOCUMENTS

| | | | | |
|---|---|---|---|---|
| 6,861,596 | B2* | 3/2005 | Schnackenberg | 200/43.01 |
| 7,684,199 | B2* | 3/2010 | Yee et al. | 361/725 |
| 7,688,572 | B2* | 3/2010 | Yee et al. | 361/614 |
| 7,800,888 | B2* | 9/2010 | Morris et al. | 361/614 |
| 8,054,606 | B2* | 11/2011 | Morris et al. | 361/115 |
| 2002/0095744 | A1* | 7/2002 | Narang et al. | 16/229 |
| 2005/0070166 | A1* | 3/2005 | Brandt et al. | 439/638 |
| 2007/0111575 | A1* | 5/2007 | Jensen et al. | 439/246 |
| 2008/0022673 | A1* | 1/2008 | Morris et al. | 60/431 |
| 2008/0023211 | A1* | 1/2008 | Yee et al. | 174/50.52 |
| 2008/0258667 | A1* | 10/2008 | Morris et al. | 318/490 |
| 2009/0086414 | A1* | 4/2009 | Yee et al. | 361/614 |
| 2010/0157512 | A1* | 6/2010 | Yee et al. | 361/614 |
| 2011/0149480 | A1* | 6/2011 | Leeman et al. | 361/608 |
| 2011/0285483 | A1* | 11/2011 | Morris et al. | 335/71 |
| 2011/0310851 | A1* | 12/2011 | Klingenbrunn et al. | 370/332 |

* cited by examiner

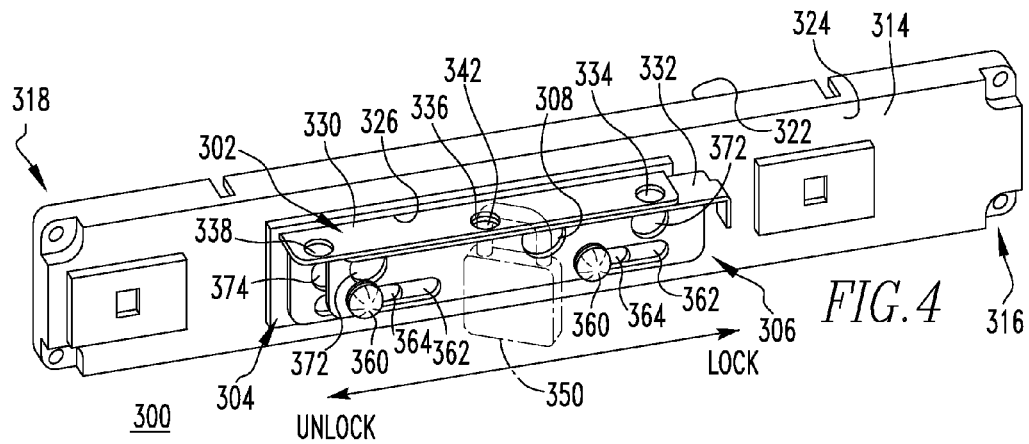
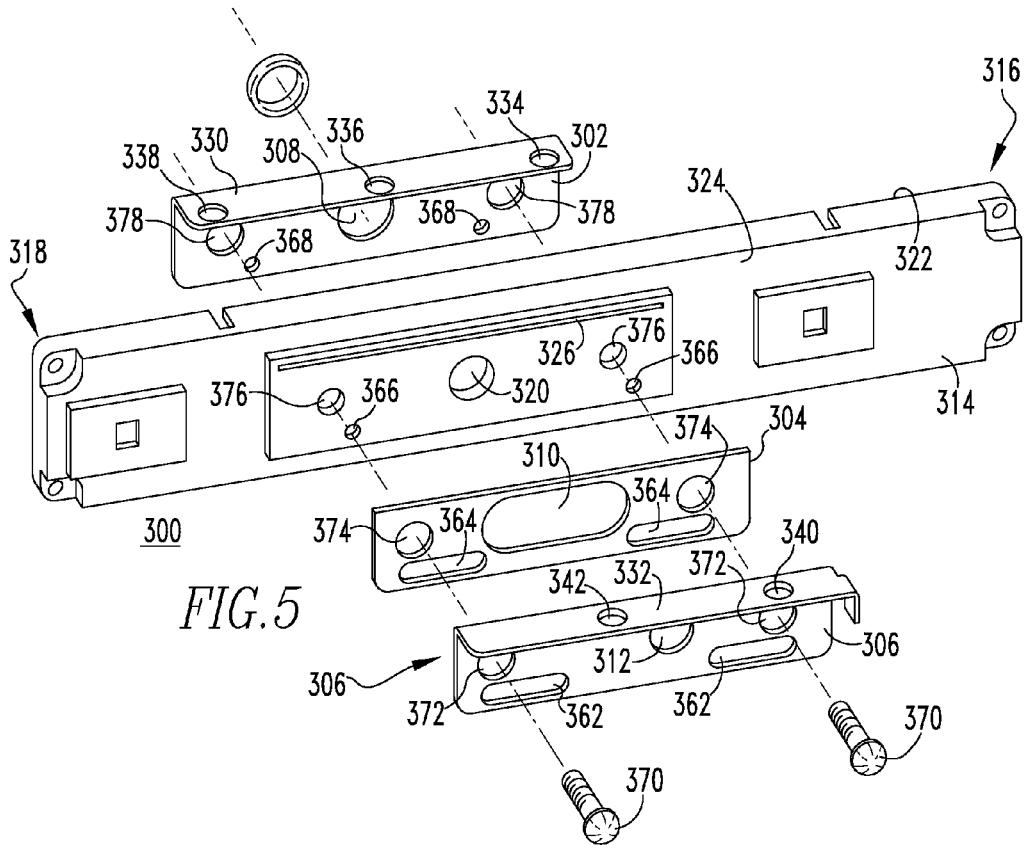

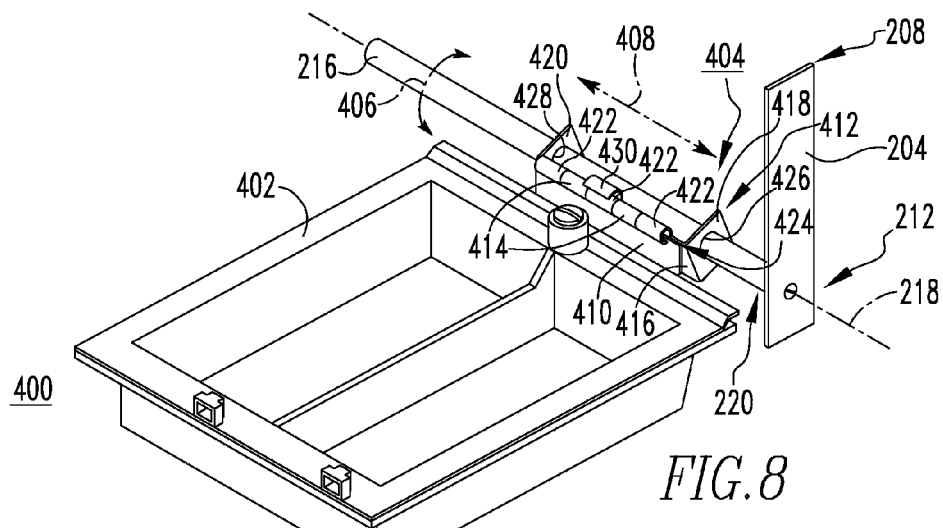
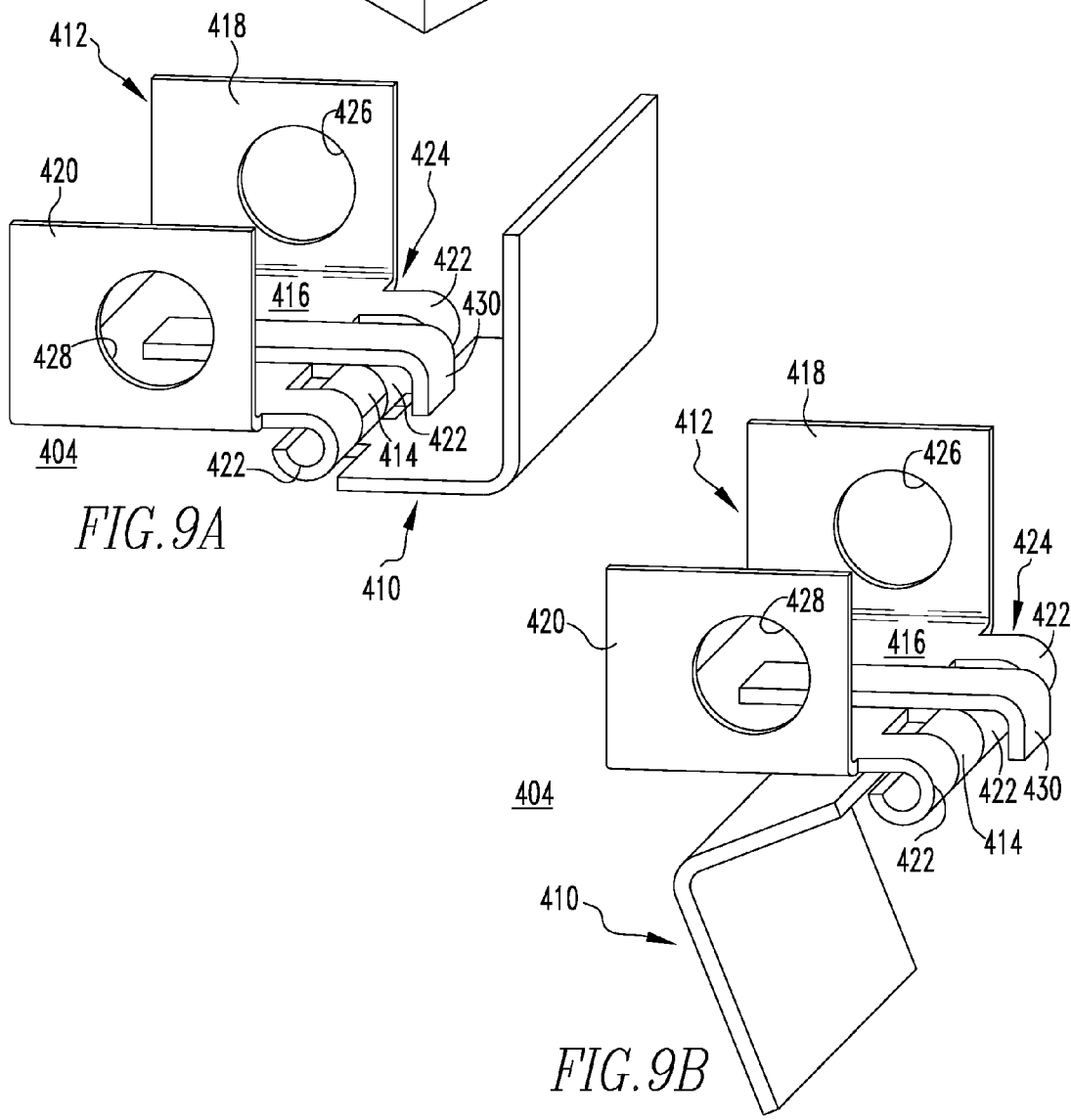

MOTOR CONTROL CENTER AND SUBUNIT THEREFOR

CROSS-REFERENCE TO RELATED APPLICATION

This application is a divisional of application Ser. No. 12/535,763, filed Aug. 5, 2009 now U.S. Pat. No. 7,965,493, and entitled "MOTOR CONTROL CENTER AND SUBUNIT THEREFOR."

BACKGROUND

1. Field

The disclosed concept relates generally to motor control systems, and more particularly, to motor control centers. The disclosed concept also relates to subunits for motor control centers.

2. Background Information

Motor control centers are used, for example, in some commercial and industrial applications to distribute electrical power to a variety of loads (e.g., without limitation, relatively high power electrical motors, pumps, and other loads).

FIG. 1, for example, shows a portion of a motor control center 10. The motor control center 10 includes a multi-compartment enclosure 12 for receiving a plurality of motor control modules 14,16,18,20,22,24, commonly referred to as "buckets". Typically, each bucket (see, e.g., bucket 22 of FIG. 1; also shown in FIG. 2) is a removable, pull-out subunit that has, or is installed behind, a door 26. The door 26 is preferably coupled to the housing 12 by hinges 28 (shown in phantom line drawing in FIG. 1) to permit access to motor control components of the bucket 22 while it is installed in the enclosure 12. For example and without limitation, the door 26 permits access to a circuit breaker assembly 30, a stab indicator 32, a shutter indicator 34, and a line contact actuator 36. When the bucket 22 is fully installed and electrically connected behind the door 26 of the enclosure 10, an operator may operate a disconnect handle 38. In a de-energized state of the motor control center 10, the operator may operate an isolation feature by moving a slide 40 and inserting crank 42 through a hole 43 in the door 26 to access the line contact actuator 36 to move a number of line contacts (see, for example, stab contacts 46,48,50 of the bucket 22 of FIG. 2) to an isolated position out of (see FIG. 2) electrical contact with power lines or buses 52 (partially shown in phantom line drawing in FIG. 2) of the motor control center 10. Motor control centers and subunits therefor are described in greater detail, for example, in commonly assigned U.S. Patent Application Publications 2009/0086414, 2008/0258667, 2008/0023211 and 2008/0022673, which are hereby incorporated herein by reference There is room for improvement in motor control centers, and in subunits therefor.

SUMMARY

These needs and others are met by embodiments of the disclosed concept, which are directed to a subunit for a motor control center, wherein the subunit includes at least one of: (a) a panel assembly (e.g., without limitation, pilot device panel assembly) for providing access to internal motor control components; (b) a locking assembly enabling components of the subunit to be locked (e.g., without limitation, padlocked) in a variety of different positions; and (c) a secondary disconnect assembly, which among other benefits, does not employ wiping or sliding electrical contacts, thereby improving reliability of the electrical connection.

As one aspect of the disclosed concept, a subunit is provided for a motor control center. The motor control center includes an enclosure having an exterior, an interior and a number of compartments disposed on the interior, a plurality of power lines, and a number of covers for covering the compartments. The subunit comprises: a housing structured to be removably disposed within a corresponding one of the compartments of the enclosure; a plurality of electrical contacts movably coupled to the housing; an actuating assembly structured to move the electrical contacts between a first position corresponding to the electrical contacts being electrically connected to the power lines of the motor control center, and a second position corresponding to the electrical contacts not being electrically connected to the power lines; and a locking assembly for locking the position of the electrical contacts. When the locking assembly is locked, the locking assembly restricts access to the actuating assembly and prevents a corresponding one of the covers of the motor control center from being opened. The locking assembly is lockable when the electrical contacts are in the first position and when the electrical contacts are in the second position.

The locking assembly may comprise a plurality of bracket members, each including a thru hole, and a mount comprising a first end, a second end disposed opposite and distal from the first end, and an access hole disposed between the first end and the second end. At least one of the bracket members may be movable with respect to the mount to align the thru hole of each of the bracket members with the access hole of the mount. When the thru holes are aligned with the access hole, the access hole may be structured to provide access to the actuating assembly of the subunit through the corresponding one of the covers of the enclosure.

As another aspect of the disclosed concept, a subunit is provided for a motor control center. The motor control center includes an enclosure having a number of compartments. The subunit comprises: a housing including a first sidewall and a second sidewall disposed opposite distal from the first sidewall, the housing being structured to be removably disposed within a corresponding one of the compartments of the enclosure; a shaft extending between the first sidewall and the second sidewall, the shaft including a longitudinal axis; and a panel assembly including a panel member and a hinge assembly movably coupling the panel member to said shaft. The panel member is pivotable about the longitudinal axis of the shaft in order to pivot with respect to the housing, and the panel member is translatable along the longitudinal axis of the shaft in order to translate back and forth with respect to the housing.

The hinge assembly may comprise a first hinge element and a second hinge element pivotably coupled to the first hinge element, wherein the first hinge element is coupled to the panel member and the second hinge element is movably disposed on the shaft. The first hinge element may comprise a number of first connecting elements. The second hinge element may comprise a generally planar portion, a first protrusion extending outwardly from the generally planar portion, a second protrusion extending outwardly from the generally planar portion opposite and distal from the first protrusion, and a number of second connecting elements. The second connecting elements of the second hinge element may cooperate with the first connecting elements of the first hinge element to form a pivoting joint between the first hinge element and the second hinge element. Each of the first protrusion of the second hinge element and the second protrusion of the second hinge element may include an aperture, wherein the shaft extends through the aperture of the first protrusion and the aperture of the second protrusion.

As a further aspect of the disclosed concept, a subunit is provided for a motor control center. The motor control center includes an enclosure having a number of compartments and a plurality of power lines. The subunit comprises: a housing including a first side and a second side disposed opposite and distal from the first side, the housing being structured to be removably disposed within a corresponding one of the compartments of the enclosure; a plurality of primary electrical contacts movably coupled to the housing; an actuating assembly structured to move the primary electrical contacts into and out of electrical contact with the power lines of the motor control center; and a secondary disconnect assembly including a first electrical connector and a second electrical connector, the first electrical connector being structured to be coupled to a portion of the corresponding one of the compartments of the enclosure of the motor control center, the second electrical connector being coupled to a corresponding one of the first side of the housing of the subunit and the second side of the housing of the subunit, the second electrical connector being structured to be electrically connected to the first electrical connector when the subunit is disposed within the corresponding one of the compartments of the enclosure of the motor control center. The secondary disconnect assembly is independent from the actuating assembly in order that movement of the primary electrical contacts with respect to the housing does not move the secondary disconnect assembly.

The first electrical connector may include a plurality of first secondary electrical contacts, and the second electrical connector may include a plurality of second secondary electrical contacts. The primary electrical contacts may be movable among a connected position, a test position, and a withdrawn position, wherein the first secondary electrical contacts are electrically connected to the second secondary electrical contacts when the primary electrical contacts are disposed in the connected position and when the primary electrical contacts are disposed in the test position. When the primary electrical contacts are moved between the connected position and the test position, neither the first electrical connector nor the second electrical connector may move in order that undesired movement of the first secondary electrical contacts with respect to the second secondary electrical contacts may be avoided.

As another aspect of the disclosed concept, a motor control center is provided. The motor control center comprises: an enclosure having an exterior and an interior; a number of compartments disposed on the interior; a plurality of power lines; a number of covers for covering the compartments; and at least one subunit comprising: a housing removably disposed within a corresponding one of the compartments of the enclosure, a plurality of electrical contacts movably coupled to the housing, an actuating assembly for moving the electrical contacts between a first position corresponding to the electrical contacts being electrically connected to the power lines of the motor control center, and a second position corresponding to the electrical contacts not being electrically connected to the power lines, and at least one of a locking assembly for locking the position of the electrical contacts and restricting access to the actuating assembly, a panel assembly, and a secondary disconnect assembly.

BRIEF DESCRIPTION OF THE DRAWINGS

A full understanding of the disclosed concept can be gained from the following description of the preferred embodiments when read in conjunction with the accompanying drawings in which:

FIGS. 4 and 5 are isometric assembled and exploded views, respectively, of a locking assembly for a motor control center subunit, in accordance with an embodiment of the disclosed concept;

FIG. 8 is an isometric view of the panel assembly of FIG. 7;

FIGS. 9A and 9B are isometric views of the hinge assembly for the panel assembly of FIG. 8, respectively showing the hinge assembly in the closed and open positions;

DESCRIPTION OF THE PREFERRED EMBODIMENTS

Figure 1:
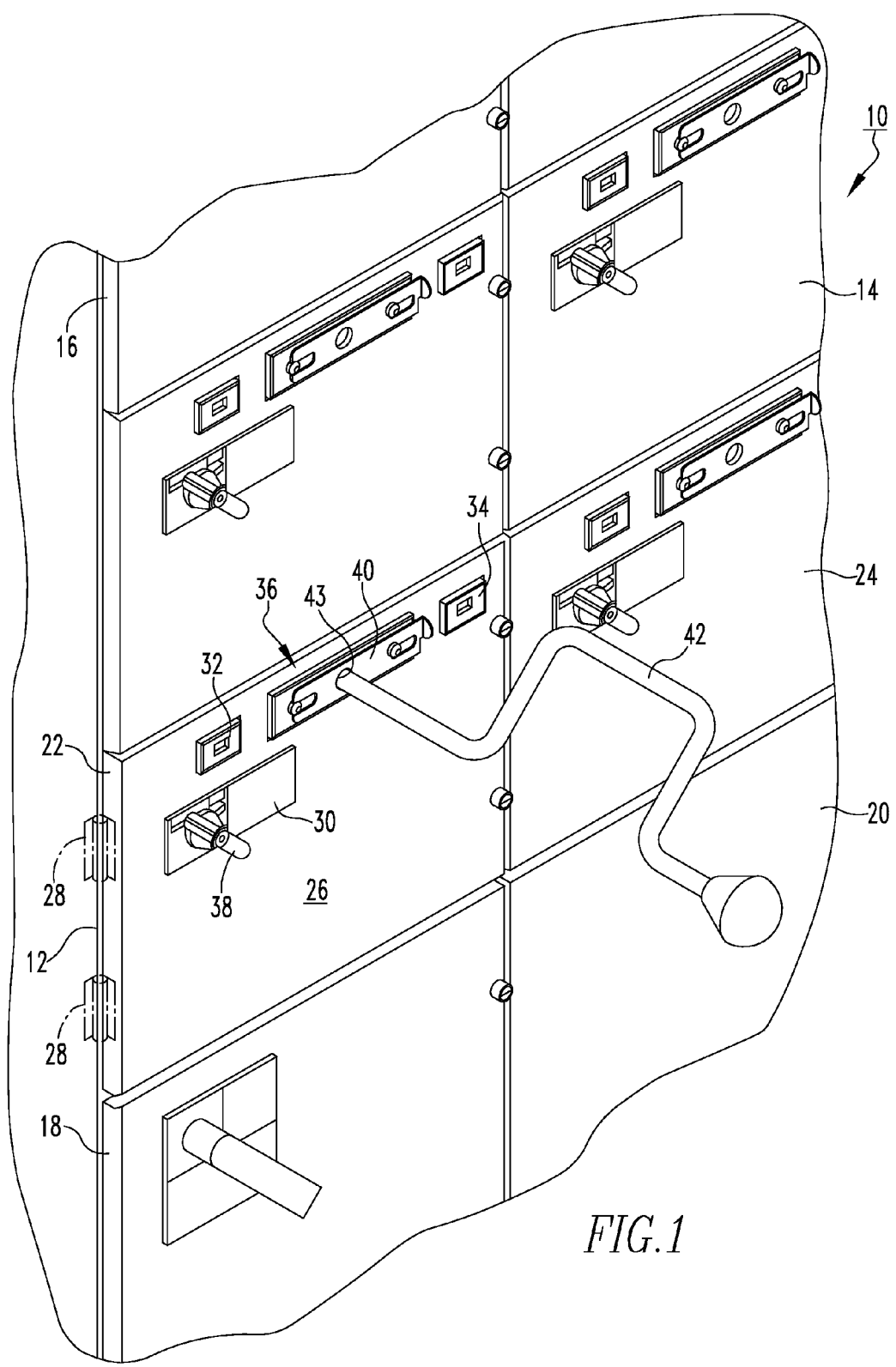
FIG. 1 is an isometric view of a portion of a motor control center and subunits therefor.

Directional phrases used herein, such as, for example, left, right, clockwise, counterclockwise, top, bottom, front, back, upper, lower and derivatives thereof, relate to the orientation of the elements shown in the drawings and are not limiting upon the claims unless expressly recited therein.

As employed herein, the terms "supply power," "supply power lines," "power lines," "motor power," "load power" and "line power" refer to any known or suitable voltage or current characteristic, and expressly include but are not limited to, three phase AC power, single phase AC power, DC power, multiple DC power lines, or any combination thereof.

As employed herein, the term "bucket" refers to a subunit or module for a motor control center.

As employed herein, the term "motor control components" shall be understood to include the various types of devices and control components, which may be housed in a motor control center bucket for connection to the supply power. Such devices and components expressly include, but are not limited to, contactors, relays, motor controllers, disconnects, circuit protective devices, and the like.

As employed herein, the term "shaft" refers to any known or suitable member (e.g., without limitation, rod; pole; dowel; pin; linear bearing member) structured to provide translation (e.g., without limitation, linear movement back and forth) of the disclosed panel assembly along the longitudinal axis of the shaft and/or pivotal motion of the disclosed panel assembly about the longitudinal axis of the shaft.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "fastener" refers to any known or suitable connecting or tightening mechanism expressly including, but not limited to, rivets, pins, screws, bolts and the combinations of bolts and nuts (e.g., without limitation, lock nuts) and bolts, washers and nuts.

As employed herein, the term "number" shall mean one or an integer greater than one (i.e., a plurality).

Figure 3:
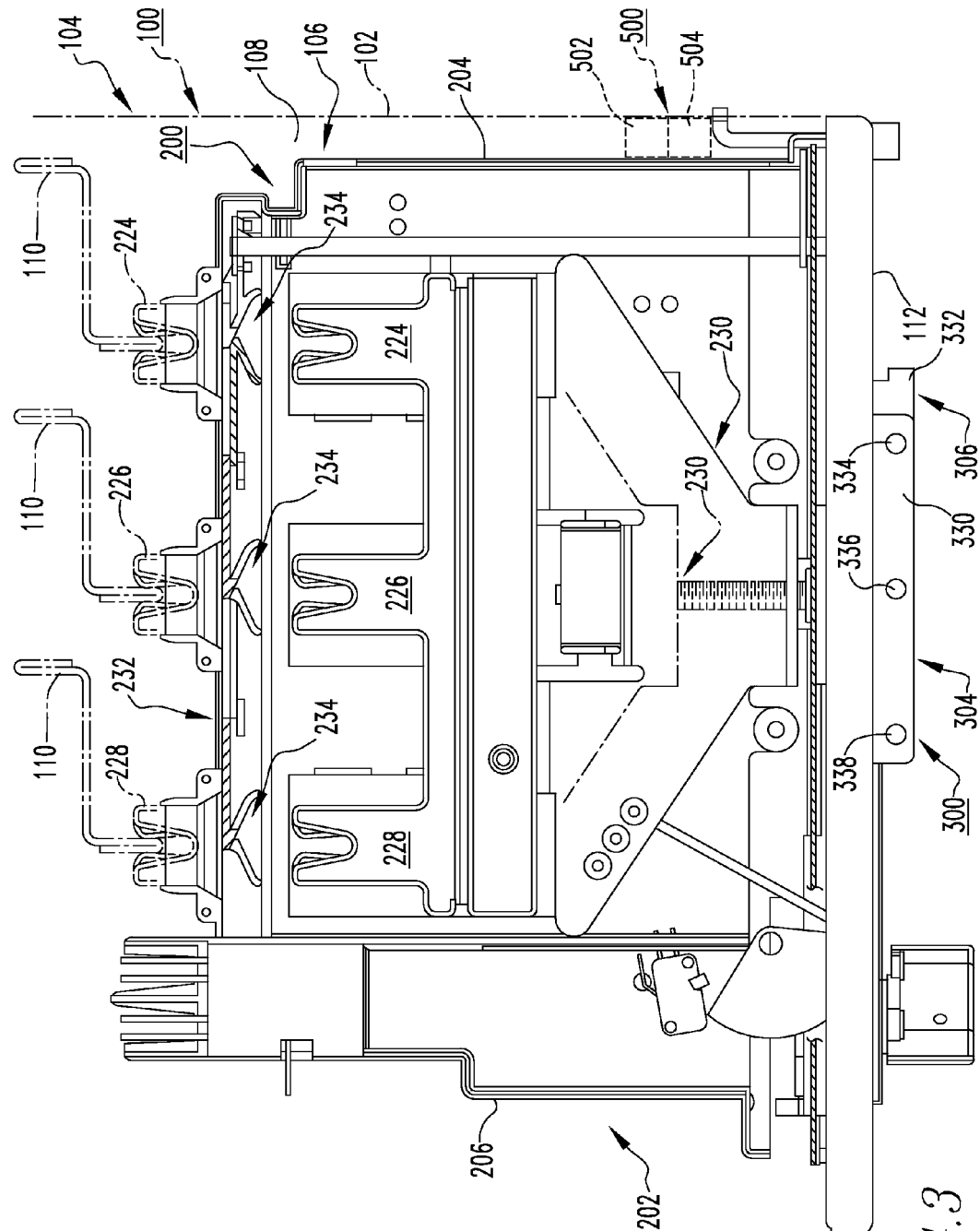
FIG. 3 is a top plan view of a motor control center subunit, in accordance with the disclosed concept.
Figure 11:
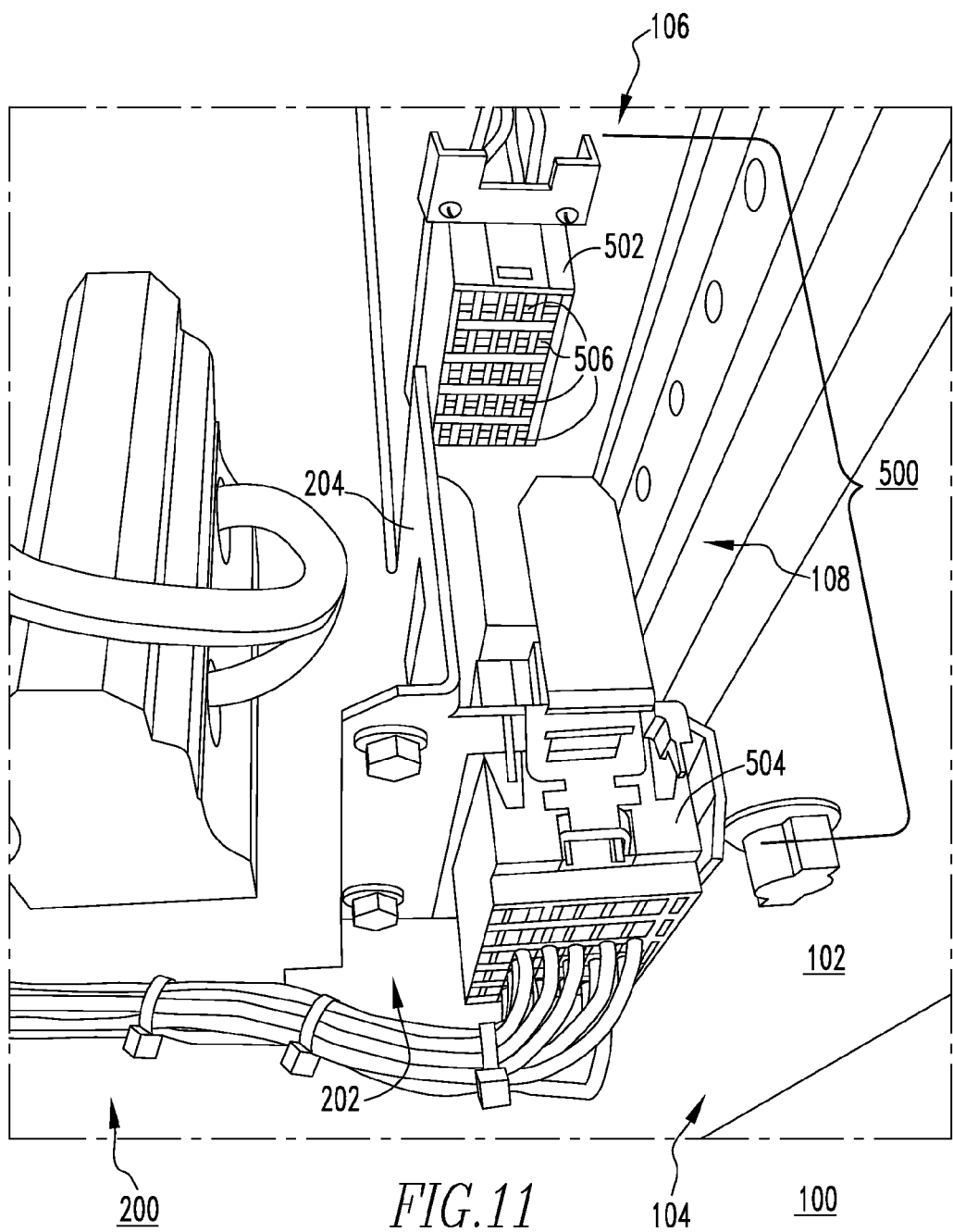
FIG. 11 is a front isometric view of the portion of the subunit and secondary disconnect assembly therefor of FIG. 10.
Figure 12:
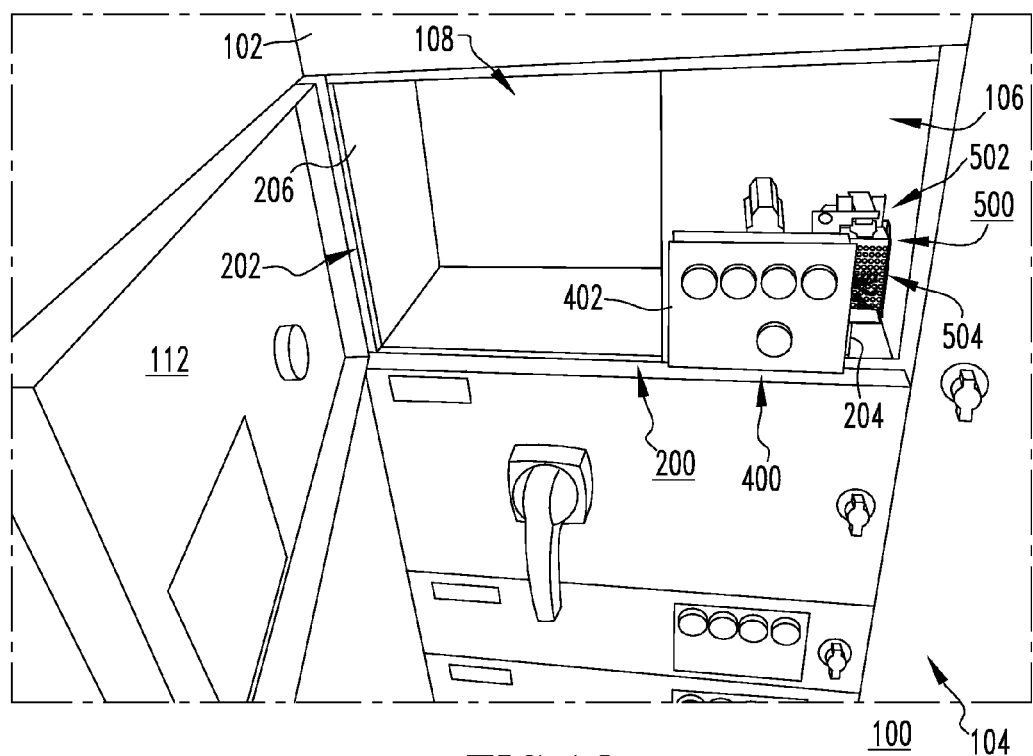
FIG. 12 is an isometric view of a portion of a motor control center and subunit therefor, showing the subunit in simplified form installed within the motor control center enclosure in accordance with the disclosed concept.

FIG. 3 shows a subunit 200 for a motor control center 100 (partially shown in phantom line drawing; see also FIGS. 11 and 12). The motor control center 100 includes an enclosure 102 having an exterior 104, an interior 106, and a number of compartments 108 disposed on the interior 106, as best shown in FIG. 12. The motor control center 100 further includes a plurality of power lines 110 (shown in phantom line drawing in FIG. 3), and a number of covers 112 (one cover 112 is shown in FIG. 1) for covering the compartments 108. The example cover is a hinged door 112, which is pivotable between the closed position of FIG. 3 and an open position as shown, for example, in FIG. 12.

Continuing to refer to FIG. 3, the subunit 200 includes a housing 202, which is structured to be removably disposed within a corresponding one of the compartments 108 of the motor control center enclosure 102. A plurality of electrical contacts 224,226,228 are movably coupled to the housing 202, and are movable into (shown in phantom line drawing in FIG. 3) and out of (shown in solid line drawing in FIG. 3) electrical contact with the corresponding power lines 110 of the motor control center 100. More specifically, an actuating mechanism 230 is structured to move the electrical contacts, which in the example of FIG. 3 are stab contacts 224,226,228, between the first position, shown in phantom line drawing and corresponding to the stab contacts 224,226,228 being electrically connected to the power lines 110, and the second position, shown in solid line drawing and corresponding to the stab contacts 224,226,228 not being electrically connected to the power lines 110. That is, the actuating assembly 230 includes a contact isolator assembly 232 having a plurality of shutter assemblies 234, one for each corresponding stab contact 224,226,228. Thus, when the stab contacts 224,226,228 are in the second position (e.g., corresponding to the test position or the withdrawn position), shown in solid line drawing in FIG. 3, the shutter assemblies 234 of the contact isolator assembly 232 isolate the corresponding stab contacts 224, 226,228 from the power lines 110 of the motor control center 100. Such isolator assemblies and shutter assemblies therefor are described in greater detail in commonly assigned, incorporated U.S. Patent Application Publication 2008/0258667.

Figure 2:
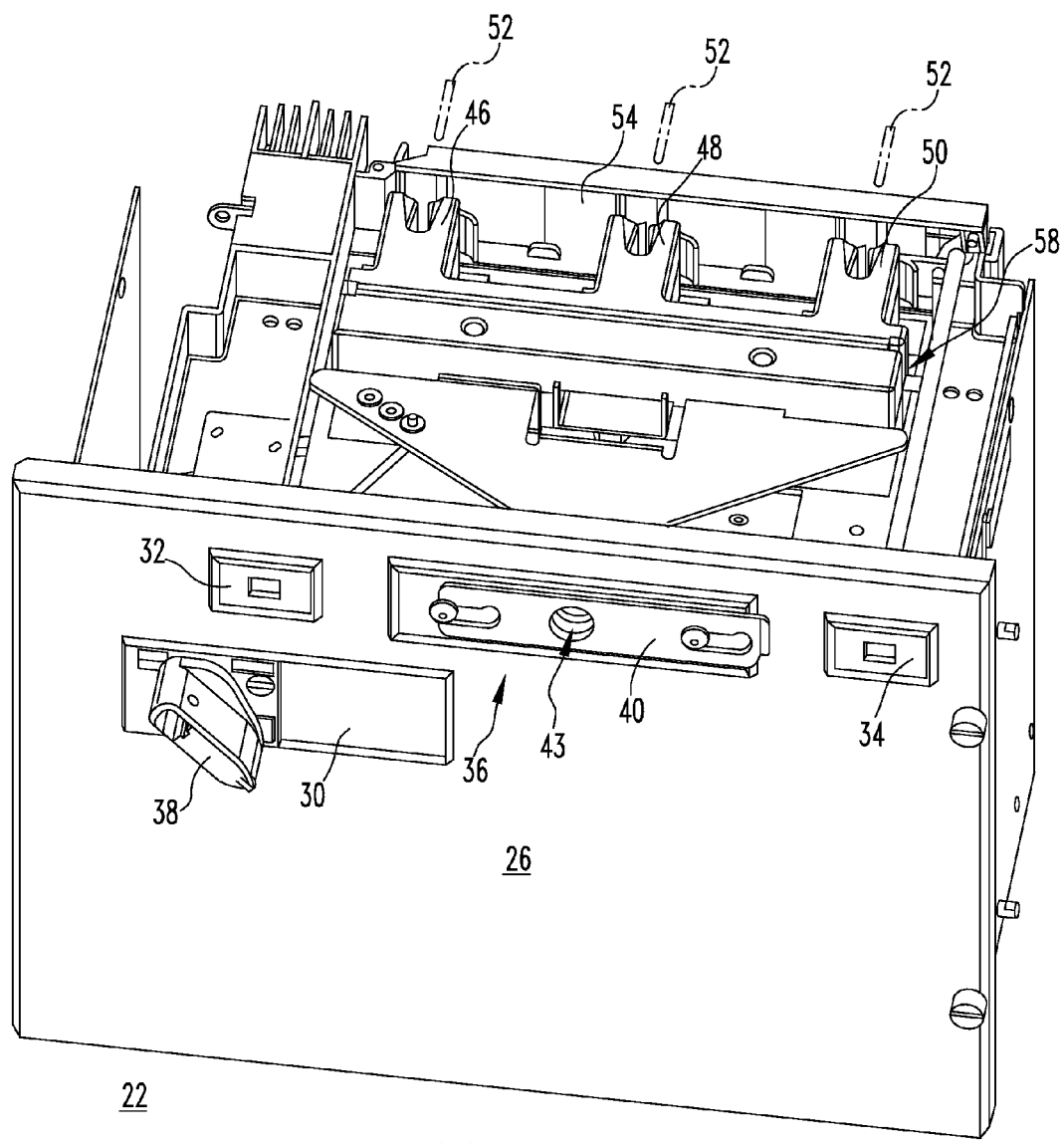
FIG. 2 is an isometric view of one of the subunits of FIG. 1.

As shown in FIGS. 3-7, the subunit 200 preferably includes a locking assembly 300, which is structured to lock (e.g., without limitation, padlock 350, as shown in phantom line drawing in FIG. 4) the position of the stab contacts 224,226, 228 in a number of predetermined positions. Among other benefits, this locking capability provides an added safety measure to resist the potential for injury to operators when the subunit 200 is moved into and out of a corresponding compartment 108 (FIGS. 3, 11 and 12) of the motor control center enclosure 102 (FIGS. 3, 11 and 12) and/or the stab contacts 224,226,228 are moved into and out of electrical contact with the power lines 110. More specifically, unlike prior art subunits (see, for example, subunit 26 of FIGS. 1 and 2) which, at best, could be adapted to incorporate a locking feature (not shown) in one position (e.g., the connected position), the disclosed locking assembly 300 is advantageously lockable both when the stab contacts 224,226,228 are in the first position (e.g., connected position, shown in phantom line drawing in FIG. 3), and when the electrical contacts 224,226,228 are in the second position (e.g., withdrawn position, shown in solid line drawing in FIG. 3).

By way of a non-limiting example with reference to FIG. 4, the locking assembly 300 is lockable (e.g., without limitation, by way of insertion of a locking element such as, for example and without limitation, the padlock 350 shown in phantom line drawing in FIG. 4) to lock the corresponding cover 112 of the motor control center enclosure 102, and restrict access to the subunit 200 from the exterior 104 of the enclosure 102, as shown in FIG. 3. The locking assembly 300 also advantageously locks the corresponding door 112 of the motor control center 110 in the closed position, shown in FIG. 3, preventing it from being opened when the motor control center 110 is energized. As discussed, it will be appreciated that the locking assembly 300 is also lockable in the second position (e.g., electrical contacts 224,226,228 withdrawn and isolated) to lock the isolator assembly 232 such that the subunit 200 is safely accessible from the exterior 104 of the motor control center enclosure 102.

As best shown in FIGS. 4 and 5, the example locking assembly 300 includes a plurality of bracket members such as, for example and without limitation, first bracket member 302, second bracket member 304, and third bracket member 306. Each of the bracket members 302,304,306 includes a thru hole 308,310,312, respectively, best shown in FIG. 5. The locking assembly 300 further includes a mount 314 having first and second opposing ends 316,318, an access hole 320 disposed between the first and second ends 316,318, and first and second opposing sides 322,324. At least one of the bracket members 302,304,306 is movable with respect to the mount 314 to align the thru holes 308,310,312 of the bracket members 302,304,306, respectively, with the access hole 320 of the mount 314 to provide access to the aforementioned actuating assembly 230 (FIG. 3) of the subunit 200 (FIG. 3) through the corresponding cover 112 (FIG. 3) of the motor control center enclosure 102 (FIG. 3). For example and without limitation, in the non-limiting example shown and described herein, the third bracket 306 is movable (e.g., without limitation, slidable to the left and to the right from the perspective of FIGS. 4 and 5) between locked (shown in phantom line drawing) and unlocked (not shown) positions, in order to control access to the actuating assembly 230 (FIG. 3).

Figure 6:
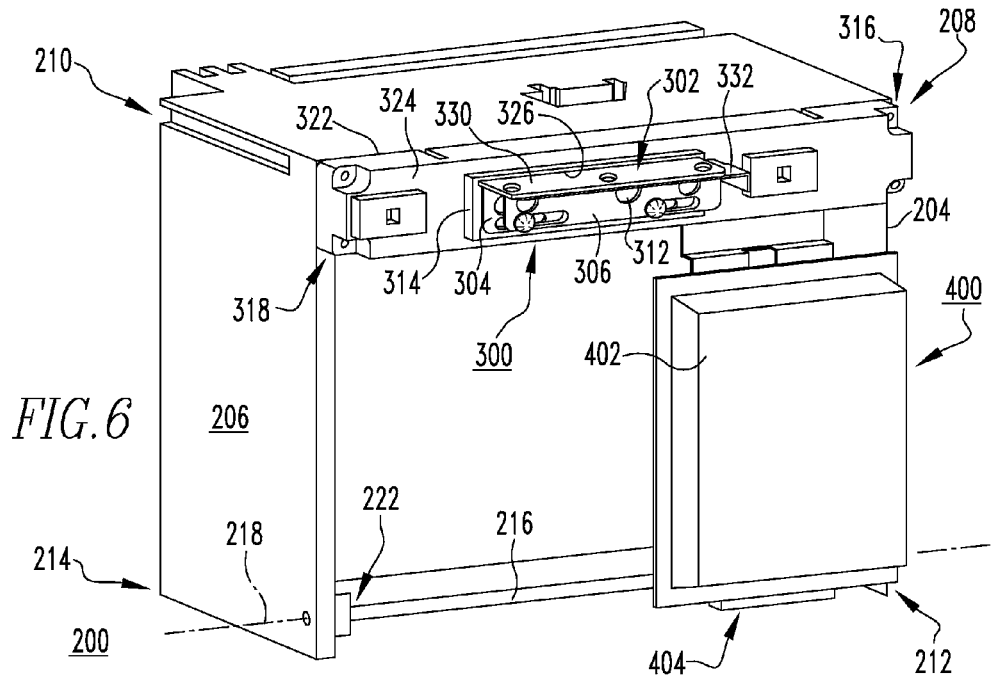
FIG. 6 is an isometric view of a subunit for a motor control center and a panel assembly therefor, in accordance with another embodiment of the disclosed concept, showing the panel assembly in the closed position.
Figure 7:
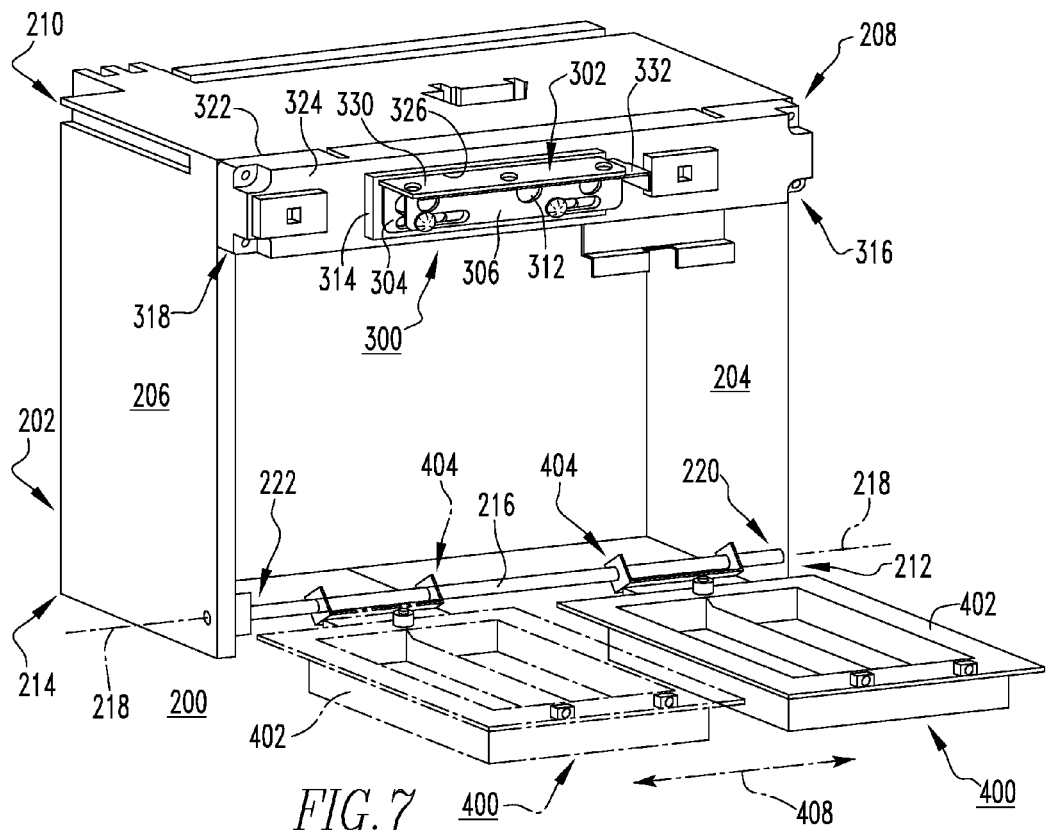
FIG. 7 is an isometric view of the subunit and panel assembly therefor of FIG. 6, showing the panel assembly in the open position is solid line drawing, and showing the panel assembly in an open and translated position in phantom line drawing.

More specifically, the first side 322 of the mount 314 faces the motor control center enclosure 102, as shown in FIGS. 6 and 7. The first bracket member 302 is disposed on the first side 322 of the mount 314 between the mount 314 and the enclosure 102. The second bracket member 304 is coupled to the second side 324 of the mount 314, between the mount 314 and the third bracket member 306, and the third bracket member 306 is movably coupled to the second bracket member 304. As best shown in FIG. 5, the mount 314 further includes an elongated slot 326, which extends from the first side 322 of the mount 314 to the second side 324, between the first and second ends 316,318 thereof.

The first bracket member 302 includes a perpendicular flange 330, which extends outwardly from the first bracket member 302, through the elongated slot 326 of the mount 314, and outwardly from the second side 324 of the mount 314, as shown in FIGS. 4, 6 and 7.

The third bracket member 306 also preferably includes a perpendicular flange 332. The perpendicular flange 330 of the first bracket member 302 includes a number of openings 334,336,338 (three are shown in the example of FIGS. 3-7), and the perpendicular flange 332 of the third bracket member 306 includes a number of openings 340,342 (two are shown in the example of FIG. 5). When the locking assembly 300 is assembled, as shown for example in FIG. 4, the perpendicular flange 330 of the first bracket member 302 at least partially overlaps the perpendicular flange 332 of the third bracket member 306. Accordingly, the third bracket member 306 is movable (e.g., without limitation, slidable to the left and the right from the perspective of FIGS. 4 and 5) among a number of positions (e.g., without limitation, unlocked position; locked position) to align at least one of the openings 342 of the third bracket member 306 with a corresponding at least one opening 336 of the first bracket member 302 to receive a locking element 350 therethrough, as shown in phantom line drawing in FIG. 4. It will be appreciated, however, that any known or suitable number and/or configuration of openings could be included in the bracket members 304,306 of the locking assembly 300, without departing from the scope of the disclosed concept. It will further be appreciated that any known or suitable type and/or number of locking elements (e.g., without limitation, padlocks 350) could be employed to lock the locking assembly 300 in a desired predetermined position. Accordingly, the disclosed locking assembly 300 advantageously provides the ability to lock the subunit 200 (FIG. 3) in a number of positions. That is, safety is improved by virtue of the fact that the aforementioned contact isolator assembly 232 (FIG. 3) can be locked in either the connected position, wherein the stab contacts 224,226,228 are electrically connected to the power lines 110 of the motor control center 100, as shown in phantom line drawing in FIG. 3, and it can be locked when the stab contacts 224,226,228 are in the withdrawn or disconnected position, shown in solid line drawing in FIG. 3.

As shown in FIG. 4, the example locking assembly 300 includes a number of first fasteners 360 (two are shown), which extend through slots 362 in the third bracket member 306, through slots 364 in the second bracket member 304 and openings 366 in the mount 314, and fasten the third bracket member 306 and the second bracket member 304 to the first bracket member 302. The slots 362 of the third bracket member 306 enable it to be movable, as previously discussed. Of course, it will be appreciated that the second bracket member 304 could also be movable (e.g., without limitation, slidable to the left and to the right from the perspective of FIGS. 4 and 5), without departing from the scope of the disclosed concept. It will also be appreciated that any known or suitable number, type and/or configuration of fasteners, other than the pair of first fasteners 360 which are shown, could be employed. Similarly, any known or suitable alternative number, type and/or configuration of second fasteners, other than the pair of second fasteners 370, which extend through holes 372 of the third bracket member 306, holes 374 of the second bracket member 304, holes 376 of the mount 314, and holes 378 of the first bracket member 302, to fasten the locking assembly 300 to the motor control center enclosure 102 (FIGS. 3, 6 and 7), could be employed. The movable nature of at least the third bracket member 306 of the locking assembly 300 enables the aforementioned holes 372,374,376,378 to be aligned to provide access to the mounting fasteners 370, or alternatively, to restrict access thereto, as desired.

In addition to the locking assembly 300, the example subunit 200 (FIGS. 3, 6, 7 and 10-12) also includes a panel assembly 400, such as for example, a pilot device panel assembly. It will, however, be appreciated that such panel assembly 400 could be employed on a motor control center subunit (e.g., 200) independently, without requiring the use of the aforementioned locking assembly 300.

More specifically, as best shown in FIG. 3, the housing 202 of the motor control center subunit 200 includes first and second opposing sides or sidewalls 204,206. The first sidewall 204 includes first and second opposing edges 208,210 and the second sidewall 206 includes first and second opposing edges 212,214. A shaft 216 extends between the first and second sidewalls 204,206 and includes a longitudinal axis 218, as shown in FIGS. 6, 7 and 8. Preferably, the first end 220 of the shaft is coupled to the first sidewall 204 at or about the second edge 210 thereof, and the second end 222 of the shaft 216 is coupled to the second sidewall 206 at or about the second edge 214 thereof, as shown in FIG. 7. The panel assembly 400 includes a panel member 402 and a hinge assembly 404 for movably coupling the panel member 402 to the shaft 216, such that the panel member 412 is pivotable about the longitudinal axis 218 of the shaft 216, for example and without limitation, in the direction of arrow 406 of FIG. 8, and is also translatable back and forth (e.g., without limitation, slidable to the left and to the right from the perspective of FIGS. 6-8) in the direction of arrow 408 of FIGS. 7 and 8.

As noted previously, the example panel member is a pilot device panel 402, which is positioned behind the cover or door 112 of the enclosure 102, as shown in FIG. 12. the pilot device panel 402 is used, for example and without limitation, for control circuitry functions such as, for example and without limitation, start, stop, local/remote, forward, reverse, trip indication, remote reset and the like. The functions can be initiated or provided, for example, in the form of push buttons, indicating lights and/or selector switches (not shown in FIGS. 6-8 for ease of illustration, but see, for example and without limitation, pilot device panel 402 of FIG. 12).

As best shown in FIGS. 9A and 9B, the hinge assembly 404 preferably includes a first hinge element 410 and a second hinge element 412, which is pivotably coupled to the first hinge element 410. The first hinge element 410 is coupled to the panel member 402 (FIGS. 6-8), and the second hinge element 412 is movably disposed on the aforementioned shaft 216 (FIGS. 6-8). More specifically, the first hinge element 410 includes a number of first connecting elements 414 (e.g., without limitation, hinge barrels) (two first connecting elements 414 are shown in the non-limiting example hinge assembly 404 shown and described herein). The second hinge element 412 includes a generally planer portion 416, a first protrusion 418 extending outwardly from the generally planar portion 416, a second protrusion 420 extending outwardly from the generally planar portion 416 opposite and distal from the first protrusion 418, and a number of second connecting elements 422 (e.g., without limitation, hinge barrels structured to cooperate with corresponding hinge barrels of the first hinge element to receive a hinge pin (not shown)) (three second connecting elements 422 are shown in the non-limiting example shown and described herein). The second connecting elements 422 of the second hinge element 412 cooperate with the first connecting elements 414 of the first hinge element 410 to form a pivoting joint 424 therebetween.

The second hinge element protrusions 418,420 include apertures 426,428, respectively. Accordingly, the aforementioned shaft 216 extends through the aperture 426 of the first protrusion 418 and the aperture 428 of the second protrusion 420, as best shown in FIG. 8. This structure enables the panel assembly 400 (FIGS. 6-8) to translate along the shaft 216 in accordance with the disclosed concept.

The example hinge assembly 404 further includes a stop member 430, which extends outwardly from the second hinge element 412, as shown in FIGS. 9A and 9B. The panel member 402 is pivotable between the open position, shown in FIGS. 7 and 8 (see also open position of hinge assembly 404 of FIG. 9B), and the closed position, shown in FIG. 6. When the panel member 402 is disposed in the open position (FIGS. 7 and 8), the stop member 430 does not engage the first hinge element 410 and the panel member 402 is free to pivot about the longitudinal axis 218 (FIGS. 6-8) of the shaft 216 (FIGS. 6-8). When the panel member 402 is disposed in the closed position (FIG. 6), the stop member 430 engages a portion of the first hinge element 410, as shown in FIG. 9A, to stop the panel member 402 in the closed position. In other words, the stop member 430 functions to engage the first hinge element 410 and/or a portion of the panel member 402 to resist undesired over rotation of the panel member 402 about the shaft 216, as well as to establish the desired closed position, shown in FIG. 6.

Accordingly, it will be appreciated that the disclosed panel assembly 400 simplifies and improves the assembly and accessibility of the subunit 200 by providing multi-directional freedom of movement, including but not limited to, increased articulation of the panel member 402, the ability to move fully open the panel member 402, and improved configuration, orientation and operation of the panel member 402 and hinge assembly 404. Among other benefits, this advantageously provides easy access, for example, to pilot device wiring (not shown for ease of illustration) on the back side (e.g., interior side, shown in FIG. 7) of the example pilot device panel 402. For example and without limitation, the panel assembly 400 is both translatable (e.g., without limitation, slidable to the left and to the right from the perspective of FIGS. 6-8) in the direction of arrow 408 of FIGS. 7 and 8, between the positions shown in solid line drawing and phantom line drawing in FIG. 7, and pivotable (e.g., without limitation, rotatable clockwise and counterclockwise from the perspective of FIGS. 6-8) about the axis 218 of the shaft 216 in the direction of arrow 406 of FIG. 8.

In addition to the aforementioned locking assembly 300 and panel assembly 400, the subunit 200 preferably further includes a disconnect assembly 500, although it will be appreciated that such disconnect assembly 500 could be employed independently of the aforementioned locking assembly 300 and/or the aforementioned panel assembly 400.

For example and without limitation, the aforementioned stab contacts 224,226,228 of the motor control center subunit 200 are the primary electrical contacts for electrical connection to the power lines 110 of the motor control center 100, as shown in phantom line drawing in FIG. 3. The secondary disconnect assembly 500, in one non-limiting example shown in FIGS. 10-12, functions to electrically connect first and second electrical connectors 502,504 as shown in simplified form in phantom line drawing in FIG. 3 and, in particular, to electrically connect first and second secondary electrical contacts 506,608 (FIGS. 10 and 11) to connect, for example and without limitation, control power and communications protocol of the motor control center 100.

The first electrical connector 502 is preferably coupled to a portion of a corresponding one of the compartments 108 of the motor control center enclosure 102, as shown in simplified form in phantom line drawing in FIG. 3 (also shown in FIGS. 11 and 12). The second electrical connector 504 is coupled to a corresponding side (e.g., without limitation, first sidewall 204) of the subunit housing 202, as shown in simplified form in phantom line drawing in FIG. 3 (also shown in FIGS. 10-12). Accordingly, the second electrical connector 504 is electrically connected to the first electrical connector 502 when the subunit 200 is disposed within the corresponding compartment 108 of a motor control center enclosure 102, as shown in simplified form in phantom line drawing in FIG. 3 (see also FIG. 12). The secondary disconnect assembly 500 is advantageously independent from the actuating assembly 230 of the motor control center subunit 200 in order that movement of the primary electrical contacts 224,226,228 with respect to the housing 202 does not move the secondary disconnect assembly 500.

Specifically, as previously discussed, the primary electrical contacts (e.g., without limitation, stab contacts 224,226,228) of the motor control center subunit 200 are movable among the connected position shown in phantom line drawing in FIG. 3, a test position (shown in solid line drawing in FIG. 3), and a withdrawn position. It will be appreciated that the stab contacts 224,226,228 are in substantially the same position in both test and withdrawn positions. When the primary electrical contacts 224,226,228 are disposed in the connected position or test position, the first and second secondary electrical contacts 506,508 of the first and second electrical connectors 502,504, respectively, of the secondary disconnect assembly 500 are electrically connected. In particular, in such positions, neither of the first electrical connector 502 nor the second electrical connector 504 moves, in order to avoid undesired movement (e.g., wiping; sliding) of the first secondary electrical contacts 506 with respect to the secondary electrical contact 508. In this manner, the disclosed secondary disconnect assembly 500 provides the desired electrical connections, without requiring a relatively complex secondary disconnect assembly and/or wiping or sliding of the secondary electrical contacts. Wiping or sliding of the contacts, which occurs in some prior art designs, is known to result in an unreliable electrical connection. It will be appreciated that this is made possible by the independent nature of the secondary disconnect assembly 500 with respect to the movable actuator assembly 230 of the subunit 200, as will be best appreciated with reference to FIG. 3.

Figure 10:
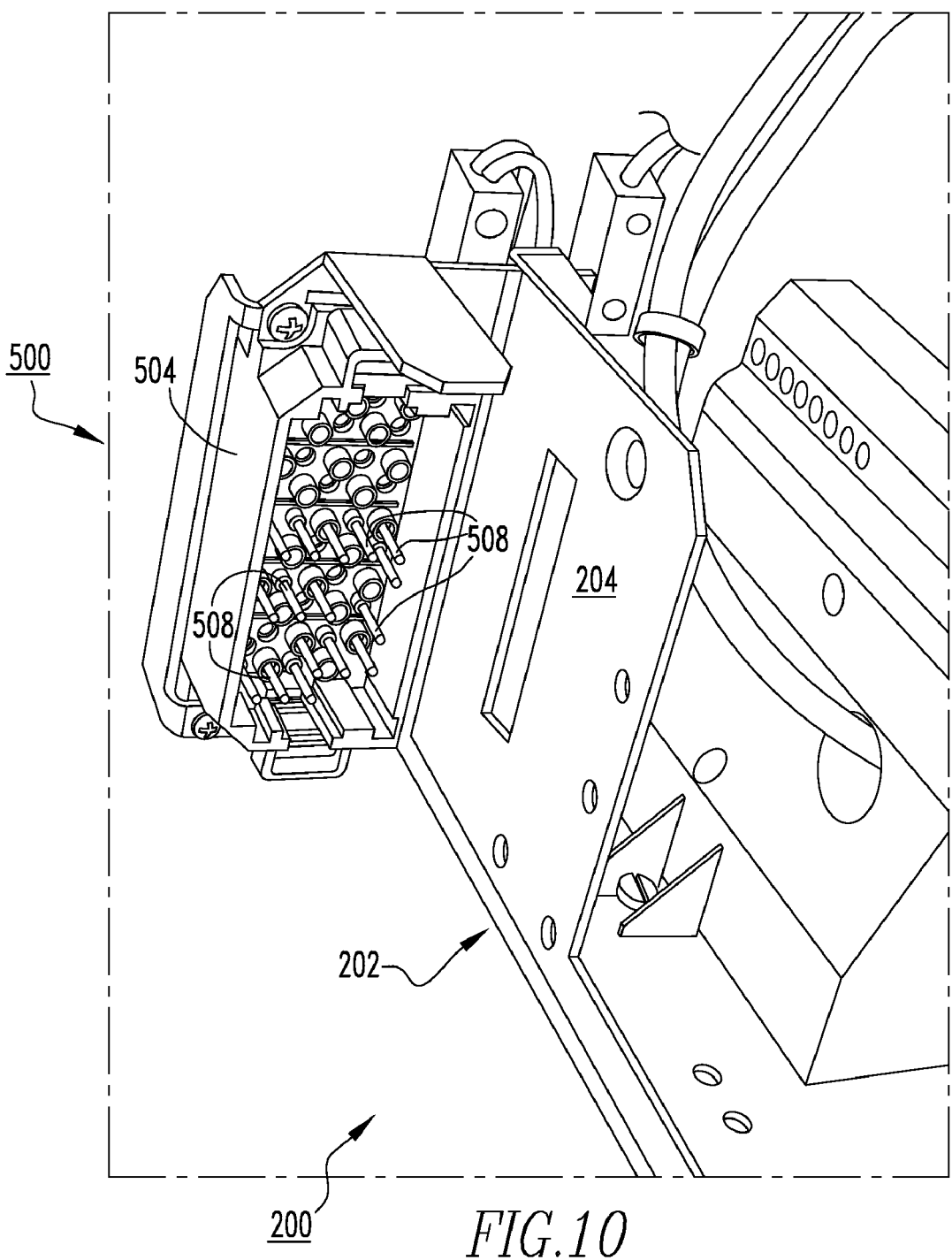
FIG. 10 is a back isometric view of a portion of a motor control center subunit and secondary disconnect assembly therefor, in accordance with another embodiment of the disclosed concept.

In the example shown and described herein, the first secondary electrical contacts 506 of the first electrical connector 502 are a plurality of receptacle contacts 506, best shown in FIG. 11, and the second secondary electrical contacts 508 of the second electrical connector 504 are a plurality of pin contacts 508, best shown in FIG. 10. Thus, when the first electrical connector 502 of the secondary disconnect assembly 500 is electrically connected to the second electrical connector 504 of the secondary disconnect assembly 500, as shown in FIG. 12 (also shown in simplified form in phantom line drawing in FIG. 3), the pin contacts 508 are disposed in the receptacle contacts 506. However, it will be appreciated that any known or suitable alternative number, type and/or configuration of secondary electrical contacts could be employed, without departing from the scope of the disclosed concept.

Accordingly, the disclosed subunit 200 provides an improved locking assembly 300, panel assembly 400 and/or secondary disconnect assembly 500, which serve to individually and collectively enhance the simplicity and functionality of the motor control center 100 and the subunit 200 therefor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A subunit for a motor control center, said motor control center including an enclosure having number of compartments, said subunit comprising:

a housing including a first sidewall and a second sidewall disposed opposite distal from said first sidewall, said housing being structured to be removably disposed within a corresponding one of the compartments of said enclosure;

a shaft extending between said first sidewall and said second sidewall, said shaft including a longitudinal axis;

a panel assembly including a panel member and a hinge assembly movably coupling said panel member to said shaft, wherein said panel member is pivotable about the longitudinal axis of said shaft in order to pivot with respect to said housing, and wherein said panel member is translatable along the longitudinal axis of said shaft in order to translate back and forth with respect to said housing.

2. The subunit of claim 1 wherein each of said first sidewall of said housing and said second sidewall of said housing includes first edge and a second edge disposed opposite the first edge; wherein said shaft includes a first end and a second end disposed opposite and distal from the first end; wherein the first end of said shaft is coupled to said first sidewall at or about the second edge of said first sidewall; and wherein the second end of said shaft is coupled to said second sidewall at or about the second edge of said second sidewall.

3. The subunit of claim 1 wherein said hinge assembly comprises a first hinge element and a second hinge element pivotably coupled to said first hinge element; wherein said first hinge element is coupled to said panel member; and wherein said second hinge element is movably disposed on said shaft.

4. The subunit of claim 3 wherein said first hinge element comprises a number of first connecting elements; wherein said second hinge element comprises a generally planar portion, a first protrusion extending outwardly from said generally planar portion, a second protrusion extending outwardly from said generally planar portion opposite and distal from said first protrusion, and a number of second connecting elements; wherein said second connecting elements of said second hinge element cooperate with said first connecting elements of said first hinge element to form a pivoting joint between said first hinge element and said second hinge element; wherein each of said first protrusion of said second hinge element and said second protrusion of said second hinge element includes an aperture; and wherein said shaft extends through said aperture of said first protrusion and said aperture of said second protrusion.

5. The subunit of claim 3 wherein said hinge assembly further comprises a stop member; wherein said stop member extends outwardly from said second hinge element; wherein said panel member is pivotable between an open position and a closed position; wherein, when said panel member is disposed in said open position, said stop member does not engage said first hinge element and said panel member is free to pivot about the longitudinal axis of said shaft; and wherein, when said panel member is disposed in said closed position, said stop member engages a portion of said first hinge element to stop said panel member in said closed position.

* * * * *